United States Patent [19]

Champagne

[11] Patent Number: 4,524,359
[45] Date of Patent: Jun. 18, 1985

[54] RADAR SYSTEM FOR REDUCING ANGLE TRACKING ERRORS

[75] Inventor: Edwin B. Champagne, Kettering, Ohio

[73] Assignee: The United States of America as represented by the Secretary of the Air Force, Washington, D.C.

[21] Appl. No.: 401,164

[22] Filed: Jul. 23, 1982

[51] Int. Cl.³ .............................................. G01S 13/44
[52] U.S. Cl. .................................. 343/16 M; 343/427
[58] Field of Search ................ 343/5 CM, 16 M, 7 A, 343/5 NQ, 16 LS

[56] References Cited

U.S. PATENT DOCUMENTS

| | | | |
|---|---|---|---|
| 2,983,920 | 5/1961 | Rearwin | 343/824 |
| 3,323,127 | 5/1967 | Vogel | 343/113 |
| 3,760,418 | 9/1973 | Cash et al. | 343/18 E |
| 3,803,618 | 4/1974 | Coleman | 343/754 |
| 3,946,382 | 3/1976 | Kossiakoff et al. | 343/5 DP |
| 3,949,955 | 4/1976 | Sykes et al. | 343/16 M X |
| 4,131,254 | 12/1978 | Underwood | 343/16 M X |
| 4,213,130 | 7/1980 | Vaessen | 343/16 M |
| 4,231,533 | 11/1980 | Durig | 244/3.16 |
| 4,366,483 | 12/1982 | Hagedon et al. | 343/16 M X |

OTHER PUBLICATIONS

"Optical Tracking Systems", 18–19 Jan. 1971 Seminar, pp. 39–50.

Primary Examiner—T. H. Tubbesing
Assistant Examiner—John B. Sotomayor
Attorney, Agent, or Firm—Donald J. Singer; Bernard E. Franz

[57] ABSTRACT

An array of detector elements located at the focal plane of an antenna system can be used to reduce or eliminate the influence of glint induced tracking errors and increase the field-of-view of angle-of-arrival detection systems. The array at the focal plane is divided into four quadrants. Each quadrant has its own receive channel to detect the amplitude of the signals focused on that quadrant. The resulting amplitude signals are compared in pairs for diagonally opposite quadrants to develop two error signals (i.e., elevation and azimuth). This noncoherent detection is equivalent to an optical quadrant detector.

3 Claims, 10 Drawing Figures

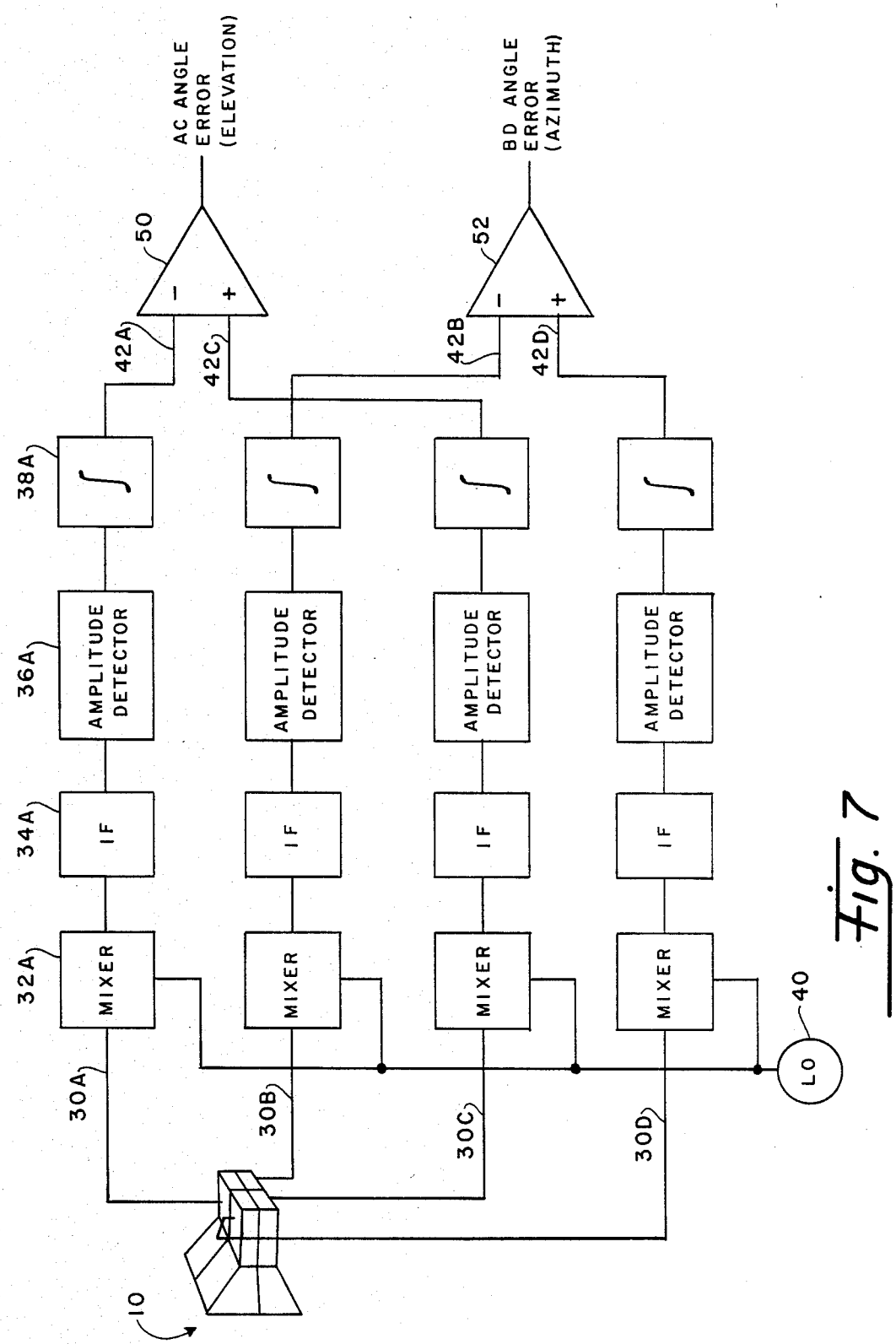

RADAR SYSTEM FOR REDUCING ANGLE TRACKING ERRORS

RIGHTS OF THE GOVERNMENT

The invention described herein may be manufactured and used by or for the Government of the United States for all governmental purposes without the payment of any royalty.

BACKGROUND OF THE INVENTION

This invention relates to a tracking radar system which reduces the errors experienced at short range or with relatively large targets caused by the form of tracking noise called angle noise, angle scintillations, angle fluctuations or target glint.

In radar tracking of a target several measurement errors are encountered from characteristics of the target itself. Angular scintillation, glint, is the wandering of the center of reflection of a target from its effective center. This appears on a radar display as an apparent displacement of the target from its mean position. The displacement may consistently vary as is well known in the art. For targets several wavelengths long, such as aircraft, the apparent radar mean position, center, will wander as the target rotates relative to the line-of-sight. When a target is in a radar short-range region, glint becomes a dominant problem for targets extending over several wavelengths. Radar echos received from a single target can be from several points on the target, indicating a rotating group of isolated points and disclosing an apparent multiple-point target. The reflecting points of a multiple-point target are fixed with respect to the target mean position but appear to wander relative to the radar line-of-sight. When uncompensated for, glint can cause a moving target to appear outside of the physical boundary, or extent, of the target.

Angle fluctuations on glint is discussed briefly in the textbook by M. I. Skolnik, *Introduction to Radar Systems,* McGraw-Hill, New York (1962) at page 186; and in more detail in M. I. Skolnik, *Radar Handbook,* McGraw-Hill, New York (1970), Chapter 28, pages 28-8 through 28-15.

A glint simulator is covered by Cash et al Pat. No. 3,760,418. A multiple target tracking system with crossed antenna element arrays is disclosed in Vogel Pat. No. 3,323,127. Coleman Pat. No. 3,803,618 discloses a multimode retrodirective array in a conical configuration as shown at 46 in FIG. 4. Rearwin Pat. No. 2,983,920 shows a planar array of microwave antennas, and Kossiakoff et al Pat. No. 3,946,382 is of interest as disclosing an adaptive video processor for distinguishing from many types of noise-like clutter return. None of these references show or suggest reducing the effect of glint in a guidance system.

An optical tracking system using a laser, with a quadrant detector in the tracking receiver, is disclosed in a paper by C. R. Cooke and J. P. Speck, "Precision Aircraft Tracking System" in Proceedings—Optical Tracking Systems, a seminar sponsored by the SPIE Society of Photographic and Instrumentation Engineers, White Sands Chapter, Jan. 18-19, 1971. Durig Pat. No. 4,231,533 covers a laser target tracking system which includes a holographic quadrant selector.

SUMMARY OF THE INVENTION

An object of the invention is to reduce or eliminate the influence of glint induced tracking errors and increase the field of view of angle-of-arrival detection systems.

In the system according to the invention this object can be achieved by an array of microwave or millimeter wave detectors used in a noncoherent fashion (detection before manipulation) to generate the equivalent of an optical quadrant detector. The energy on each detector is sensed and not the energy incident on coherent combinations of detector elements as in monopulse.

The glint phenomenon encountered when using the common angle-of-arrival networks is a manifestation of the fact that the sensing network is sensitive to the phase of the energy scattered from each point on a complex target. It is a phenomenon associated with the coherent illumination of the target and the coherent signal manipulation in all of the common angle-of-arrival sensing systems, i.e., amplitude monopulse, phase monopulse, and conical scan.

A feature of the invention is that the phase is not extracted from the received signals, but only the amplitude. The amplitude sum and differences are compared.

BRIEF DESCRIPTION OF THE DRAWING

FIG. 7 is a block diagram of a receiver tracking system according to the invention.

DETAILED DESCRIPTION

The invention may be used to provide the angle-of-arrival sensing element for active or semiactive microwave or millimeter radar systems, for example, in a missile guidance system. It solves the problem of glint induced angle tracking errors which are encountered in the end game of semiactive missile guidance systems. It gives a potential for semiactive missile guidance units which do not have to be locked-on prior to launch because of the wide field-of-view sensing array. It provides the ability to track the centroid of energy into very short ranges because of the increased field-of-view.

GLINT

It is useful to relook at the phenomenon labeled "glint" which comes into play to introduce tracking errors in an active or semiactive tracking system when the target is illuminated with spatially coherent energy. The errors can become significant in the end game of missile guidance where control can be lost. The purpose of this relook is not to describe the phenomenon, this has been done many times as can be seen by reading through the references listed in Skolnik and dating back to World War II. The purpose is to show that the tracking errors generated are a function of the measurement scheme used to determine the angle-of-arrival of the incident radiation. Once this is accepted, the problem of "glint" can be addressed by looking at system approaches which minimize or eliminate its influence and not let it continue to be a phenomenon which is accepted as a fact-of-life. One contention herein is that the mathematical descriptions of the phenomenon have concentrated only on the radiation scattered from the target and as such lead to acceptance of "glint" as a fact-of-life much as noise. The scattering phenomenon is a fact-of-life; its influence on a tracking system is not.

The analysis will be in the form of simplified two-dimensional functions but the results can be extended to the general case. The interferometric form of angle-of-arrival determination and tracking control will be illustrated using as a model a simple amplitude monopulse system, but the same influence can be illustrated for phase monopulse, conical scan and other tracking schemes. The results are applicable to any spatially coherent illumination of the target be it at microwave, millimeterwave or optical frequencies.

Figure 1:
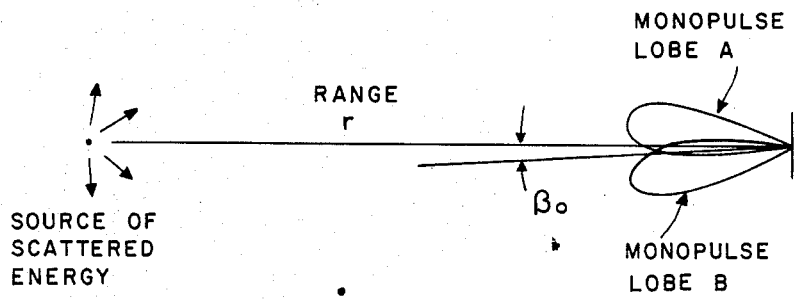
FIGS. 1-3 are diagrams for an analysis of glint, FIG. 1 showing the geometry of source of scattered energy and monopulse receiving system, FIG. 2 showing geometry of source pair and monopulse receiving system, and FIG. 3 showing geometry for determination of field pattern scattered pair of scatter sources.

The analysis will look quickly at the implementation of a monopulse angle-of-arrival measurement scheme into a closed loop tracking system. FIG. 1 illustrates a monopulse sensing network located at a range r from a scattering element. The monopulse network centerline is oriented at an angle $\beta_o$ to the line-of-sight to the scatterer. The angle $\beta_o$ is assumed to be some fraction of the beamwidth of the individual lobes of the monopulse pattern. The field incident on the receiving aperture may be represented as $$E_r \propto \frac{1}{r} e^{j[\omega(t+r/c)+\phi]} \quad (1)$$

where t and $\phi$ are measured relative to the scatterer. Operating on the sides of symmetric antenna receive lobes, the field received in channel A of the monopulse network may be represented as $$E_A \alpha [G_o + \beta_o G_1 - \beta_o^2 G_2] E_r \quad (2)$$

and the channel B signal as $$E_B \alpha [G_o - \beta_o G_1 - \beta_o^2 G_2] E_r \quad (3)$$

The r-f portion of the monopulse network provides outputs which are the sum of (2) and (3)

$$\Sigma = E_A + E_B \alpha 2[G_o - \beta_o^2 G_2] E_r \quad (4)$$

and the difference of (2) and (3)

$$\Delta = E_A - E_B \alpha 2 G_1 \beta_o E_r \quad (5)$$

The situation of interest assumes $E_r \neq 0$, i.e., the system has something other than noise on which it can operate. The implementation of a monopulse based tracking system is the electronic ratioing of (5) and (4) to generate a steering control signal $$c \frac{\Delta}{\Sigma} = \frac{\beta_o G_1 E_r}{[G_o - \beta_o^2 G_2] E_r} \quad (6)$$

Expression (6) is a rather nice control function. It is independent of signal strength, i.e., will not become unstable in the presence of a strong signal. The control is odd symmetric with $\beta_o$ for small $\beta_o$ and $G_2(\beta_o^2 G_2 < G_o)$. For $\beta_o$ as shown in FIG. 1, a positive control signal is generated which can be used to steer the axis of the system clockwise towards the line-of-sight to the source of scattered energy. If the system overshoots, the control signal will become negative and the steering command will drive the system counterclockwise back towards the line-of-sight. The result is a very stable control signal which can be used to align the system to some small fraction of the individual lobe widths.

Figure 2:
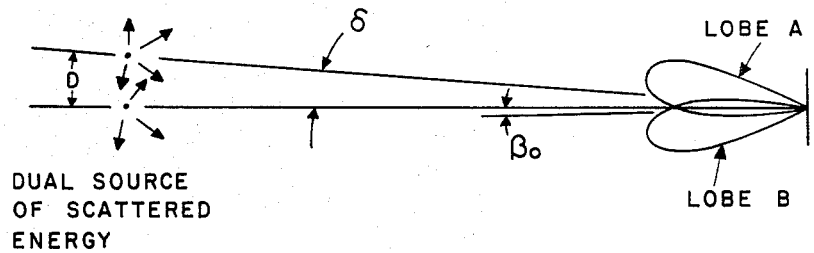

The "glint" problem manifests itself in those cases where the target is not a single scatterer but is a complex of spatially separated scatter points with arbitrary relative phase (all real targets). The "glint" condition is usually exemplified by considering two equal amplitude scatter points separated by an angle $\delta$ as shown in FIG. 2. Rather than considering all relative phases, this analysis will confine itself to the case of zero radians relative phase and $\pi$ radians relative phase as viewed from receiver. For zero radians relative phase, the signal received in channel A may be represented as $$E_A \alpha E_r [(G_o + \beta_o G_1 - \beta_o^2 G_2) + (G_o + (\beta_o + \delta) G_1 - (\beta_o + \delta)^2 G_2)] \quad (7)$$

and the signal received in channel B by $$E_B \alpha E_r [(G_o - \beta_o G_1 - \beta_o^2 G_2) + (G_o - (\beta_o + \delta) G_1 - (\beta_o + \delta)^2 G_2)] \quad (8)$$

The resulting control signal becomes $$c_o \propto \frac{\Delta_o}{\Sigma_o} = \frac{2\beta_o G_1 + 2(\beta_o + \delta) G_1}{2G_o - 2\beta_o^2 G_2 + 2G_o - 2(\beta_o + \delta)^2 G_2} =$$

$$\frac{(2\beta_o + \delta) G_1}{2G_o - \beta_o^2 G_2 - (\beta_o + \delta)^2 G_2} \quad (9)$$

Here for small $\beta_o$ and $G_2(\beta_o^2 G_2 < G_o)$ the control signal will drive the monopulse centerline to the angle $$\beta_o = -w/2 \quad (10)$$

i.e., the centroid of the scatterers.

The "glint" phenomenon manifests itself when the relative phase between the scatterers is observed as being $\pi$ radians. For this case, the signal in channel A may be represented as (scatterer 2 negative)

$$E_A \alpha E_r [(G_o + \beta_o G_1 - \beta_o^2 G_2) - (G_o + (\beta_o + \delta) G_1 - (\beta_o + \delta)^2 G_2)] \quad (11)$$

and the signal in channel B by $$E_B \alpha E_r [(G_o - \beta_o G_1 - \beta_o^2 G_2) - (G_o - (\beta_o + \delta) G_1 - (\beta_o + \delta)^2 G_r)] \quad (12)$$

Under this condition, the control signal takes the form $$c_\pi \propto \frac{\Delta_\pi}{\Sigma_\pi} = -\frac{2\delta G_1 E_r}{2\delta G_2 (2\beta_o + \delta) E_r} = \frac{-G_1}{G_2 (2\beta_o + \delta)} \quad (13)$$

This signal is odd symmetric about $\beta_o = \delta/2$ as was (9), however, there are significant differences. The signal has a large negative value at $\beta_o = -\delta/2$ and as such, if the system had been tracking and the "glint" condition occurs, the system will have a strong tendency to drive away from track. The direction of drive will depend upon the signal history leading up to the "glint" condition. Once driven away from track, the negative sign of (13) assures continued drive of the system farther and farther from boresight until beam patterns balance in outer edges of the lobes. The error can be significant and result in loss of signal if the range to the target is small.

A comparison of (6) and (13) shows that in both cases ($\phi=0,\pi$) the $\Sigma$ and $\Delta$ signals are proportional to the received signal $E_r$. In addition, the signals for $\pi$ radians phase are proportional to $\delta=D/r$ where D is the physical separation of the scatterpoints and is certainly a maximum of the physical extent of the target. When combined with the received signal range dependence, the signal powers are proportional to $$P(\Sigma \& \Delta \pi \text{ radians}) \propto \frac{1}{r^4} \quad (15)$$

and the primary influence at short ranges is obvious. The "glint" condition influences operation at long ranges, but only to the extent that the target cannot be detected. The intercept aircraft would interpret the weak signal as no signal. The dynamics of the situation can rapidly get an intercept aircraft into a "nonglint" position where the target can be detected, lock-on can occur, and a missile can be launched. It is the missile which is influenced by "glint" as it and the illuminator continually change their line-of-sight to the target and the target rotates as the missile approaches its goal. The problem is most severe in the end game where signal may be lost when the missile steers its line-of-sight off target and/or there is not sufficient time to recover from a strong "glint" induced steering commands.

Figure 3:
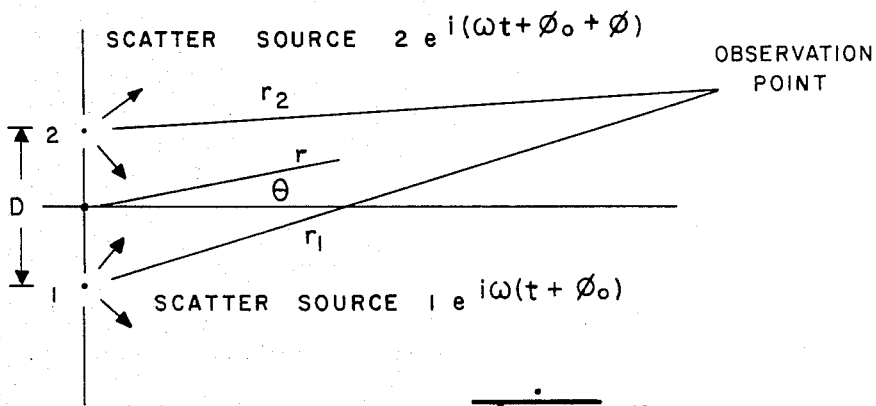

The phenomenon of "glint" induced tracking error has been viewed as a phase-front-distortion effect (see the Skolnik Handbook) for purposes of illustration. It is felt that this has led to the acceptance of it as a target phenomenon that will influence any tracking system, this is not the case. The radiation pattern of two equal amplitude scatterer sources with $\phi_r$ radians of relative phase positioned as shown in FIG. 3 may be expressed as $$E_r = E_1 + E_2 \quad (16)$$

$$= \frac{A}{r_1} \exp^{i[\omega(t-r_1/c)+\phi]} + \frac{A}{r_2} \exp^{i[\omega(t-r_2/c)+\phi+\phi_r]}$$

$$= \frac{2A}{r} \exp^{i[\omega(t-r_1+r_2)+\phi+\phi_r/2]} \cos\left[\frac{\omega}{2c}(r_1-R_2)-\frac{\phi_r}{2}\right]$$

where $r_1 \simeq r_2 \simeq r$ for amplitude purposes. The above is a traveling wave with angle dependent amplitude. It is a pattern which has nulls whenever $$\frac{\omega}{2c}(r_1-r_2) - \frac{\phi_r}{2} = (2r-1)\frac{\pi}{2} \quad (17)$$

i.e., odd multiples of $\pi/2$. The "glint" phenomenon occurs when the tracker is looking along one of these nulls. The sign of the amplitude function $$\cos\left[\frac{\omega}{2c}(r_1-r_2)-\frac{\phi_r}{2}\right] \quad (18)$$

changes as a null is traversed. As such, if a fixed coherent reference is used to probe the field, a phase shift of $\pi$ will be noted. This phase shift of $\pi$ measured relative to the reference source has been labeled phase-front-distortion. It could just as easily have been labeled a change in signal sign with no phase-front-distortion, as these two conditions will produce ambiguous results. The wave-front of any signal is defined as the normal to the direction-of-propagation is the direction of maximum spatial phase variation or the gradient of the spatial contribution to the phase. For a signal with the form of expression (16) the propagation direction may be represented as $$\vec{k} \propto \vec{r}_r\left[\frac{\omega}{2r}(r_1+r_2)\right] + \frac{\vec{\theta}}{r}\frac{\partial}{\partial\theta}\left[\frac{\omega}{2c}(r_1+r_2)\right] \quad (19)$$

for the assumed two-dimensional world. From the assumed geometry of FIG. 3

$$r_1 = [(R\sin\theta+D/2)^2+r^2\cos^2\theta]^{\frac{1}{2}} \quad (20)$$

and $$r_2 = [(r\sin\theta-D/2)^2+r^2\cos^2\theta]^{\frac{1}{2}} \quad (21)$$

Performing the indicated differentiations yields $$k \propto r\left(\frac{\omega}{2c}\right)\left\{\frac{\sin\theta(r\sin\theta + D/2) + r\cos^2\theta}{r_1} + \frac{\sin\theta(r\sin\theta - D/2) + r\cos^2\theta}{r_2}\right\} + \vec{\theta}\left(\frac{\omega}{2rc}\right)\left\{\frac{\cos\theta(r\sin\theta + D/2) - r\sin\theta\cos\theta}{r_1} + \frac{\cos\theta(r\sin\theta - D/2) - r\sin\theta\cos\theta}{r_2}\right\} \quad (22)$$

which reduces to the form $$\vec{k} \propto \frac{k}{2}r\left\{\frac{r}{r_1}+\frac{r}{r_2}+\frac{D}{2}\sin\theta\left(\frac{1}{r_1}-\frac{1}{r_2}\right)\right\} + \frac{\vec{k\theta}}{2r}\left\{\frac{D}{2}\cos\theta\left(\frac{1}{r_1}-\frac{1}{r_2}\right)\right\}. \quad (23)$$

Except in the near zone (distance of the order D) the propagation vector is essentially radially outward from the centroid of the two sources. Hence, the wavefront is spherical and has no discontinuities. This is reasonable for if the wavefront did have perturbations at pattern nulls, the nulls would curve and not be the straight line functions they are known to be.

What then is "glint" if it is not a change in wavefront? It is quite simply a manifestation of the interferometric nature of the angle-of-arrival sensing networks used in tracking systems. These systems are sensitive to the amplitude distribution across their receive apertures. They have been configured to track a signal whose amplitude is uniform or slowly varying across the aperture (certainly does not change sign). When confronted with a signal that does change sign, i.e., has a strong odd symmetric amplitude component over the aperture, the measurement system gives an incorrect result.

That the angle-of-arrival measurement controls the situation can be seen by looking at the above. For a signal with an even (or strong component of same) amplitude distribution across the aperture, a control signal $$c \propto \frac{\Delta}{\Sigma} \quad (24)$$

was seen to align the tracker to the centroid of the two signal components. For an odd symmetric signal (or dominate component) the tracker will align itself with the centroid of the two sources if a control signal with the form $$c \propto -\frac{\Sigma}{\Delta} \quad (25)$$

is derived (positive control clockwise). If the phenomenon were wavefront dependent, a positive control could never be achieved for the latter case. The culprit is the angle-of-arrival system and not phase-front-distortion.

Systems are implemented around an even symmetric signal because it is the strongest signal for a given scattered power and while (25) is stable for odd symmetry, it is unstable for the most detectable and higher power, even symmetric signal. To accommodate both even and odd symmetric signals, system complexity will have to increase but it can be done.

MONOPULSE

Figure 4:
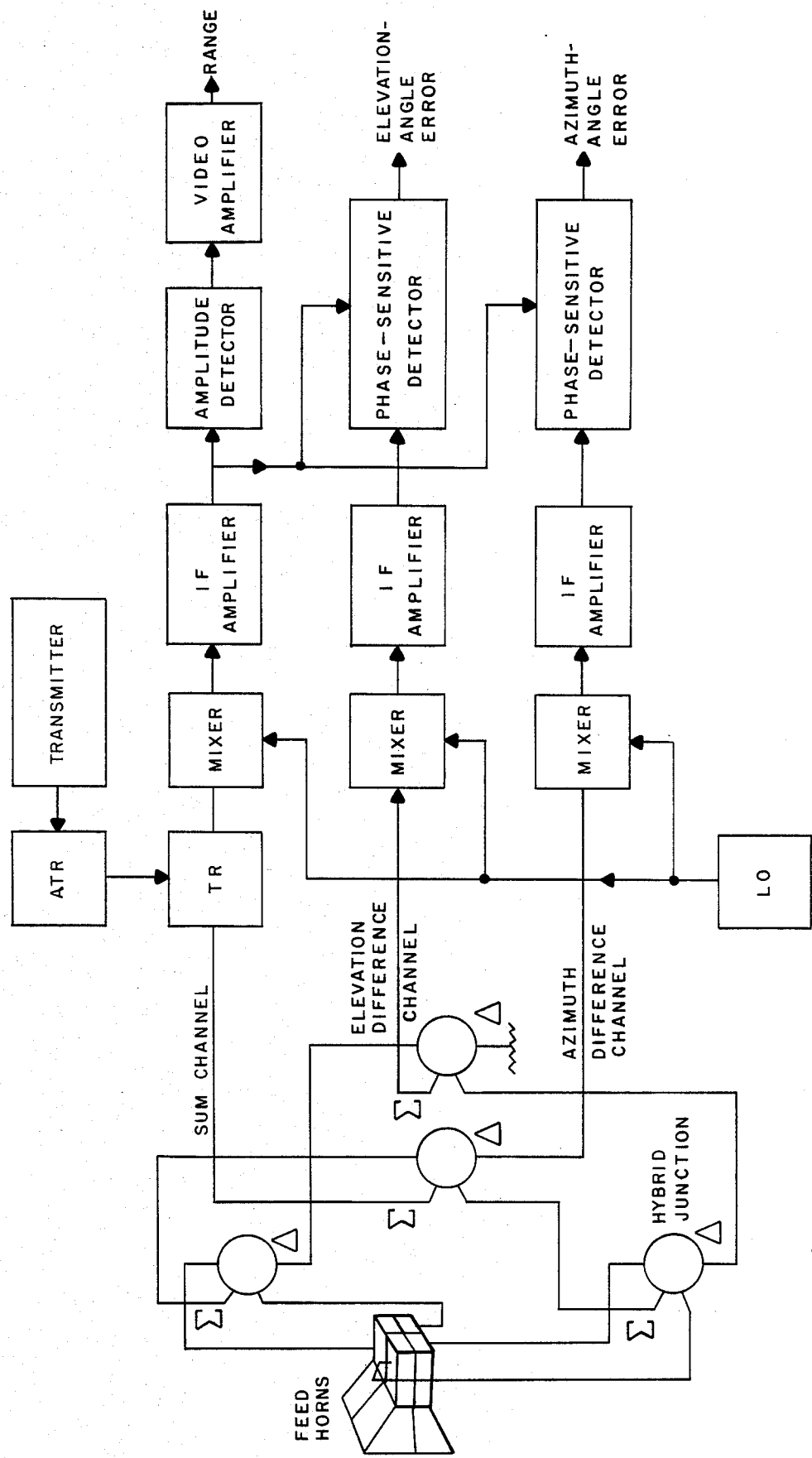
FIG. 4 is a block diagram of a two-coordinate (azimuth and elevation) amplitude-comparison-monopulse tracking radar.

A block diagram of a prior art monopulse radar for extracting error signals in both elevation and azimuth is shown in FIG. 4. The cluster of four feeds generates four partially overlapping antenna beams. The feeds might be used with either a parabolic reflector or a lens. All four feeds generate the sum pattern. The difference pattern in one plane is formed by taking the sum of two adjacent feeds and subtracting this from the sum of the other two adjacent feeds. The difference pattern in the orthogonal plane is obtained by adding the differences of the orthogonal adjacent pairs. A total of four hybrid junctions generate the sum channel, the azimuth difference channel, and the elevation difference channel. Three separate mixers and IF amplifiers are shown, one for each channel. All three mixers operate from a single local oscillator in order to maintain the phase relationships between the three channels. Two phase-sensitive detectors extract the angle-error information, one for azimuth, the other for elevation. Range information is extracted from the output of the sum channel after amplitude detection.

NEW TRACKING RECEIVER

Figure 5A:
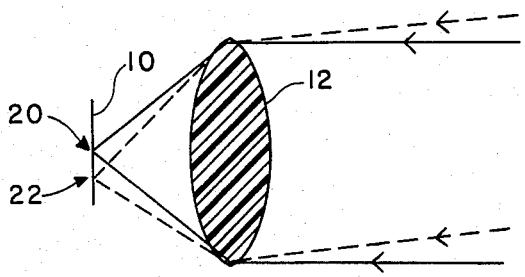
FIGS. 5A, 5B and 5C are diagrammatic cross section views of three different types of focusing antenna systems.
Figure 5B:
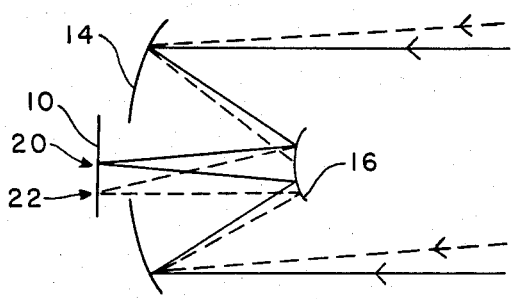
Figure 5C:
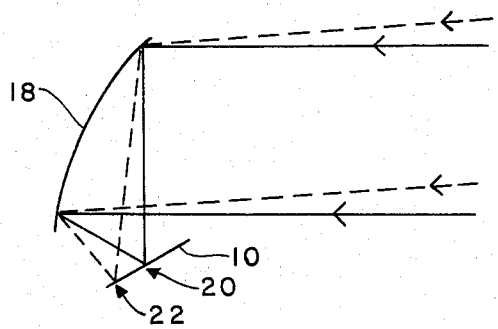

In an embodiment of a system according to the invention, a receiving antenna array of microwave or millimeter wave detectors is used in a noncoherent receive mode to eliminate the influence of glint induced tracking errors and to increase a tracking sensor's field-of-view. The detector array is viewed primarily as a set of receive-only elements used to sense the angle-of-arrival of the incident radiation scattered from a target illuminated by a separate source. The detector elements of the antenna array should be located in the focal plane of a microwave or millimeterwave collection aperture. FIGS. 5A, 5B, and 5C show typical antenna systems which focus the incoming radiation reflected by the target. In each case the array 10 of detecting elements is located at the focal plane. In FIG. 5A a lens 12 of dielectric material provides the focusing action. FIG. 5B shows a Cassegrain antenna having a parabolic reflector 14 and a hyperbolic subreflector 16. FIG. 5C shows a parabolic reflector 18 with offset feed. These antennas are all described in the Skolnik "Introduction to Radar Systems" text, chapter 7. In each case the radiation received on the boresight direction of the antenna as approximately parallel rays, shown by solid lines, is focused on the center 20 of the detector array 10. Radiation arriving at other angles, such as that shown by dashed lines, is focused on the detector array offset from the center, as indicated by reference character 22.

Figure 6:
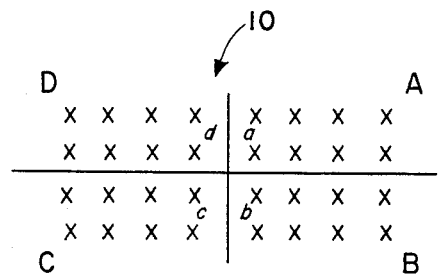
FIG. 6 is a diagrammatic representation of an array of detector elements at the focal plane in an antenna system.

The array 10 located in the image plane is shown by a diagram in FIG. 6. Each of the individual detector elements is represented by a small x. The array is divided into four quadrants A, B, C, and D. Each quadrant must be a subarray with its own feed line. The normal receiver configuration for a radar or communication system is a single element, or 3 or 4 elements in the case of a monopulse reception network. The central elements a, b, c and d in quadrants A, B, C and D may be viewed as the four elements which are present in a 4-port monopulse angle-of-arrival sensing network, for example, the four horns shown in FIG. 4.

The glint problem encountered in the typical angle-of-arrival sensing networks is described above in the section headed "Glint", and arises because of the coherent summation and subtraction of the signals received in elements a, b, c, d before detection and the generation of a control signal. Under glint correlation, the incident signal field has a strong odd symmetric component across the collection aperture.

A block diagram of a novel angle-of-arrival detection system is shown in FIG. 7. The detection array 10 is represented by four horns, for the four elements a, b, c and d in FIG. 6. These four horns may be replaced by any suitable detection elements, or by subarrays of detection elements for the four quadrants. The four quadrants have respective feedlines 30A, 30B, 30C and 30D. Four separate receiver channels are used. There may be a common local oscillator 40 supplying the mixers of all four channels. In the channel for quadrant A, signals from the feedline 30A and the local oscillator 40 are supplied to a mixer 32A. The resulting signals are passed through an IF amplifier 34A to an amplitude detector 36A. The signal at this point will be a train of pulses. A circuit 38A is used to integrate these pulses to form a signal proportional to the amplitude of the R.F. pulses on the feedline 30A. This might be a simple shunt capacitor, an operational amplifier with a feedback capacitor to form an integrator, or some form of peak detector. All four channels have similar receiving circuits, providing detected amplitude signals on lines 42A, 42B, 42C and 42D for the four quadrants A, B, C and D respectively. Operational amplifiers 50 and 52 connected as differential amplifiers are used to combine the detected amplitude signals to derive the angle error signals. These error signals correspond to the elevation angle error and the azimuth angle error shown in FIG. 4, and are used in the same way to drive the antenna. Note that each differential amplifier has inputs for diagonally opposite quadrants of the detector array. Thus amplifier 50 has its minus and plus inputs connected to lines 42A and 42C, while amplifier 52 has its minus and plus inputs connected to lines 42B and 42D. If the detector array is oriented with quadrant A up, then the AC angle error is the elevation angle error, and the BD angle error is the azimuth angle error.

The embodiment in FIG. 7 is the equivalent of an optical quadrant detector for sensing the angle-of-arrival. An optical quadrant detector is not sensitive to glint. This equivalence is accomplished by summing the signals in each quadrant before detection or by detection and summation on a quadrant basis. The result is a signal proportional to the power incident on each quadrant. In the odd-symmetric glint condition, the energy incident on opposing quadrants is equal and a steering signal would not be generated as it is when the signals are combined before detection. The detector array 10 may be the minimum case of four detectors equivalent of the monopulse network, but requires detection before addition and subtraction as distinguished from the monopulse network.

Figure 8:
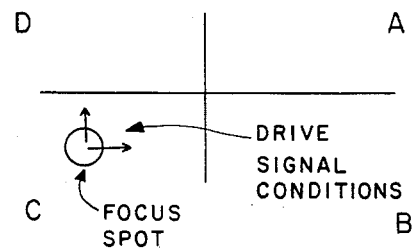
FIG. 8 is a diagram showing how the focus spot is driven toward the center of the array.

When the incident energy is detected as in FIG. 7 it is possible to generate a control signal which will drive the focus spot towards the center of the array, as illustrated in FIG. 8. The lack of signals in quadrants B and D can be used in conjunction with the signal in quadrant C to generate the appropriate control signals and eventually center the spot on the quadrants. If the system were tracking and the odd symmetric signal of glint occurred, the control would not be upset as it is in the case of coherent angle-of-arrival sensing networks. At long ranges a target may illuminate only an individual detector site, but at short ranges and/or extended scatter source a significant portion of the array may be receiving energy; however, a centroid control signal would be developed until the entire focal plane is filled. This allows positive control to much shorter ranges than is possible with a single element where positive control is lost once the beamwidth becomes narrower than the target extends.

Note that noise consideration may require threshold logic on each of the detector elements. The detectors need not be of any particular type or occur in any particular configuration. To be most effective they should not be polarization sensitive.

Thus, while preferred constructional features of the invention are embodied in the structure illustrated herein, it is to be understood that changes and variations may be made by the skilled in the art without departing from the spirit and scope of my invention.

I claim:

1. A receiver for a tracking radar system operating in the microwave to millimeter wave region in a noncoherent mode, comprising:
    antenna means including focusing means for focusing received radiation at a focal plane, an array of detector elements located at the focal plane, the array being divided into four quadrants with at least one detector element in each quadrant;
    four receiving channels, each coupled via its individual feed means to a corresponding one of said quadrants, each channel including amplitude detection means, and providing an output signal proportional to the amplitude of the received radio frequency energy on its quadrant; wherein said amplitude detection means of each channel includes an amplitude detector which produces a train of pulses, and integrating means to integrate the train of pulses to form said output signal, such that no phase information is extracted from the received signals; and
    comparison means coupled to the four receiving channels for comparing said output signals from diagonally opposite quadrants to produce error signals for use in driving the antenna means to move the focus of the received radio frequency energy toward the center of the array.

2. The receiver according to claim 1, wherein said comparison means comprises two differential amplifiers, one having two inputs connected to receive the outputs of two channels for diagonally opposite quadrants, and the other having two inputs connected to receive the outputs of the other two channels.

3. The receiver according to claim 1, wherein each channel further includes a mixer and an I.F. amplifier coupled between its said individual feed means and said amplitude detector, and local oscillator means coupled to the mixers of all four channels, so that intermediate frequency signals are supplied to the amplitude detectors.

* * * * *